Oct. 1, 1957   HENRY CHAN MUN   2,807,906
FISHING TACKLE RETRIEVER
Filed Aug. 6, 1956
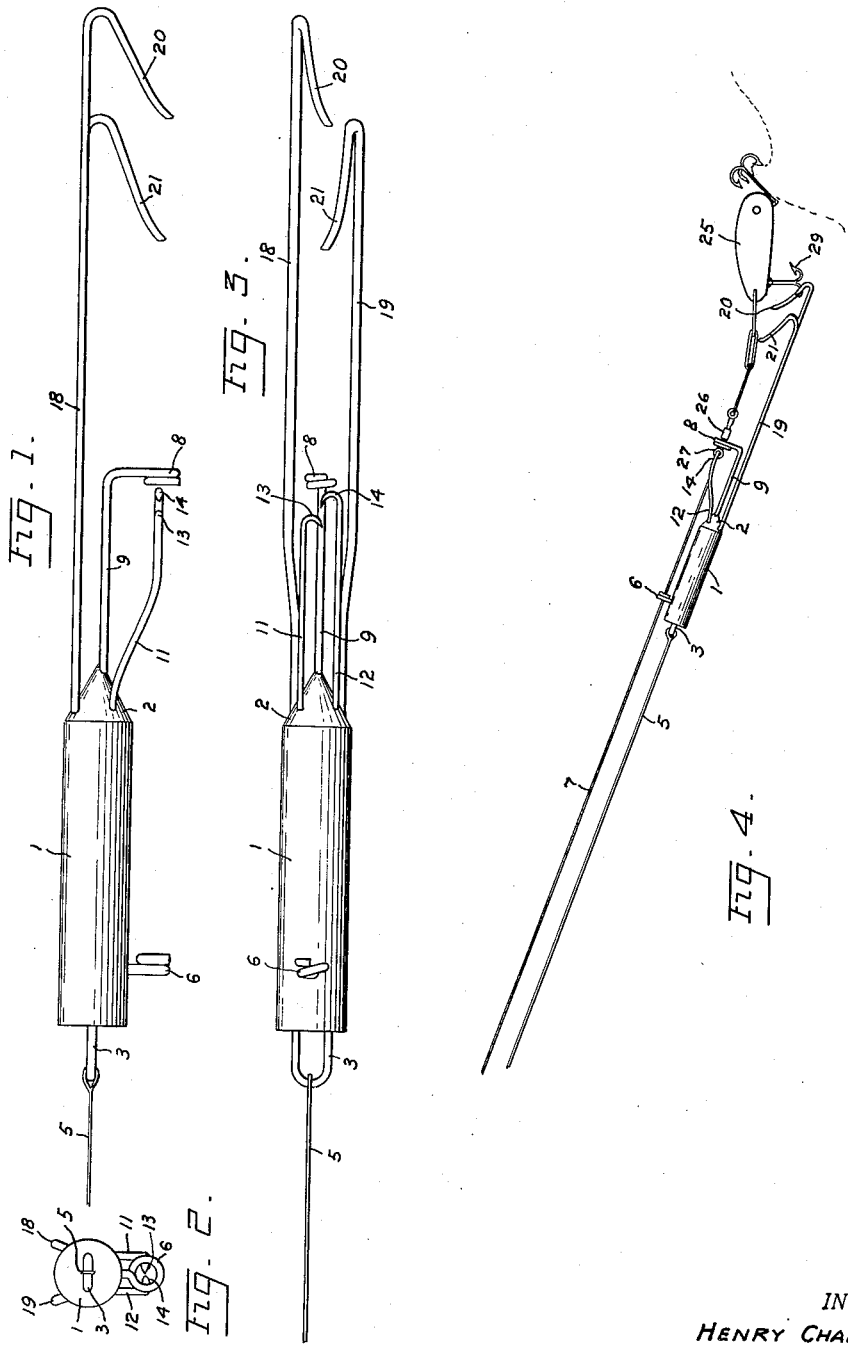
INVENTOR.
HENRY CHAN MUN
BY Alexander Riaboff
ATTORNEY

United States Patent Office 2,807,906
Patented Oct. 1, 1957

2,807,906

FISHING TACKLE RETRIEVER

Henry Chan Mun, Oakland, Calif.

Application August 6, 1956, Serial No. 602,352

3 Claims. (Cl. 43—17.2)

This invention relates to a fishing tackle retriever.

The primary object of this invention is to provide a compact, simple and reliable device for retrieving a fishing line and tackle.

Another object of the invention is to provide a retriever of the type described which is specially constructed to engage either a fishing line or the lure on the end thereof.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

This invention is illustrated by a drawing in which:

Fig. 1 is a side view of the retriever.

Fig. 2 is an end view of the retriever.

Fig. 3 is a bottom view of the retriever, and

Fig. 4 illustrates the operation of the retriever.

My device consists of a body 1, preferably cylindrical in shape and made of metal. The front end of the body is formed into a cone 2, while the rear end carries a loop 3 by which the retriever is secured to a cord line 5.

The body 1 carries a rear fishing line guide 6 in form of an open wire loop secured transversely to the body 1 near its rear end, through which loop a fishing line 7 may be easily passed. The body 1 also carries a front fishing line guide 8 in form of an open wire loop, which is secured to the cone 2 by a long stem 9, thus placing said second wire guide some distance in front of the cone 2. The fishing line 7 when passed through both guides 6 and 8 runs parallel to the longitudinal central axis of the body 1.

In addition to said stem 9, a pair of wires 11 and 12 extend from the cone 2 forwardly, terminating with small hooks 13 and 14 respectively. The wires 11 and 12 are offset in relation to the body 1, as shown in Fig. 1, so that the hooks 13 and 14 are in close proximity of the front guide 8, and each of said hooks is bent to face the fishing line 7 passing therethrough. The hook 13 is preferably slightly shorter than the hook 14. These hooks are intended to engage the fishing line 7.

In addition to said small hooks 13 and 14, the retriever carries a pair of comparatively long arms 18 and 19 secured to the front end of said body 1. Said arms 18 and 19 have their front ends formed into hooks 20 and 21 by bending said ends backwardly and toward the central guide axis. The latter hooks 20 and 21 are intended to engage the fishing tackle, and particularly the lure 25 on the end of the fishing line, as shown in Fig. 4.

The operation of the device is as follows: when a fishing line is snagged, the retriever is secured to the fishing line 7 by placing the line through the line guides 6 and 8, so that the front end of said retriever is directed toward the end of the line 7. The retriever is permitted to slide down on the fishing line 7 which is held taut. The retriever slides downwardly to the end of the line 7. Thereafter the retriever is carefully pulled back. The backward motion of said retriever may bring one of the small hooks 13 or 14 into an engagement with some portion of the line, such as a swivel joint 26, as shown in Fig. 4, wherein one of said hooks engaged an eye 27 of the swivel joint 26. The sharp points of said hooks 13 and 14 being directed toward the fishing line 7 right at the guide 8 through which said line passes is bound to engage some object on the line passing through said guide. It may also be that the hooks 20 and 21 on the arms 18 and 19 will engage some part of the lure 25, such as a fishing hook 29, as shown in Fig. 4. After either of the hooks has engaged some part of the line or the lure, the cord 5 is pulled thus retrieving either the line and the lure, or at least the line and sacrificing the lure on the end of it.

I claim:

1. A fishing tackle retriever comprising an elongated body, a loop on its rear end for attaching a cord thereto, a first line guide secured near the rear end of said body, a wire extending forwardly from the front end of said body and having a second line guide formed on the end thereof, said guides being provided for passing a fishing line therethrough, a pair of small wire hooks secured to the front end of said body and extending to said second mentioned loop and terminating in close vicinity thereto, said hooks being directed inwardly toward each other, and a pair of arms secured to said front end and extending forwardly beyond said second mentioned guide, said arms having large hooks formed at their free ends by bending said ends backwardly and toward the central axis of said guides, said small and large hooks being provided for engaging the fishing tackle.

2. A fishing tackle retriever comprising an elongated body, a means on the rear end of said body for attaching a cord thereto, a first fishing line guide secured to said body near the rear end thereof, a second fishing line guide secured to the front end of said body, a pair of small hooks extending from said front end toward the second guide and terminating in near vicinity thereto for engaging the fishing line, said hooks being directed toward each other, and a pair of arms extending forwardly from said front end, each of said arms terminating with a hook directed backwardly for engaging the fishing tackle and lure at the end of the fishing line.

3. A fishing tackle retriever comprising an elongated body, a means on the rear end thereof for attaching a cord thereto, a pair of fishing line guides for passing a fishing line therethrough, a pair of small hooks secured to said body and extending to one of said guides and terminating in close vicinity thereto for engaging the fishing line, said hooks being directed toward each other and said fishing line, and a pair of arms extending forwardly from said body, each of said arms having a hook formed on the end thereof directed backwardly for engaging the fishing tackle and lure at the end of the fishing line.

References Cited in the file of this patent

UNITED STATES PATENTS 2,609,632     Davis _____ Sept. 9, 1952